(12) United States Patent
Lee et al.

(10) Patent No.: US 7,808,990 B2
(45) Date of Patent: Oct. 5, 2010

(54) METHOD AND SYSTEM FOR DATA FILTERING FOR DATA PACKETS

(75) Inventors: Shiangfeng Lee, Irvine, CA (US); Victor Liang, Irvine, CA (US); Fei Xie, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 89 days.

(21) Appl. No.: 12/180,451

(22) Filed: Jul. 25, 2008

(65) Prior Publication Data

US 2010/0020799 A1 Jan. 28, 2010

(51) Int. Cl.
*H04L 12/56* (2006.01)

(52) U.S. Cl. ........................ 370/389; 370/392

(58) Field of Classification Search ................ 370/389, 370/392, 401
See application file for complete search history.

(56) References Cited

U.S. PATENT DOCUMENTS

| | | | |
|---|---|---|---|
| 2003/0169736 A1* | 9/2003 | Lavigne et al. | 370/392 |
| 2004/0028046 A1* | 2/2004 | Govindarajan et al. | 370/392 |
| 2005/0135351 A1* | 6/2005 | Parmar et al. | 370/389 |
| 2008/0232359 A1* | 9/2008 | Kim et al. | 370/389 |
| 2009/0204677 A1* | 8/2009 | Michaelis et al. | 709/206 |

OTHER PUBLICATIONS

Jelassi, et al., "A two-level packet classification", INT, National Institute of Telecommunication, Evry, France, pp. 1-4, Jul. 6, 2006.
Erman, et al., "Traffic Classification Using Clustering Algorithms", University of Calgary, Calgary, AB, Canada, pp. 1-6, Jan. 20, 2005.
"HSM: A Fast Packet Classification Algorithm", Bo Xu, Research Institute of Information Technology (RIIT), Tsinghua University, Dongyi Jiang, Juniper Networks, Inc., Jun Li, Research Institute of Information Technology (RIIT), Tsinghua University, Beijing, China, pp. 1-8, 19th International Conference on (1550-445X) Mar. 20-30, 2005. vol. 1.
Zander, et al., "Self-learning IP Traffic Classification based on Statistical Flow Characteristics", Centre for Advanced Internet Architectures, Swinburne University of Technology, Melbourne, Australia, pp. 1-4, Sep. 11-15, 2006.

* cited by examiner

*Primary Examiner*—Pankaj Kumar
*Assistant Examiner*—Saba Tsegaye
(74) *Attorney, Agent, or Firm*—Kenneth L. Sherman, Esq.; Michael Zarrabian, Esq.; Myers Andras Sherman LLP

(57) ABSTRACT

A method and system for filtering data packets, is provided. One implementation involves filtering data packets using a set of filters, each filter having a bit mask and corresponding bit values, by categorizing the filters into different groups based on their bit mask value differences, and generating a new mask of bits having corresponding bit values, applying the new mask to the incoming packet to select a filter category for the incoming packet, and filtering the incoming packet by applying the group of filters for the selected category to the incoming packet.

18 Claims, 4 Drawing Sheets

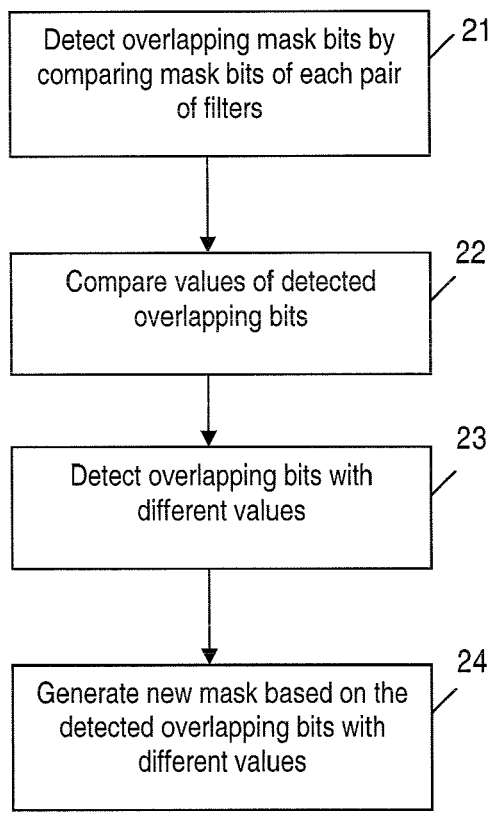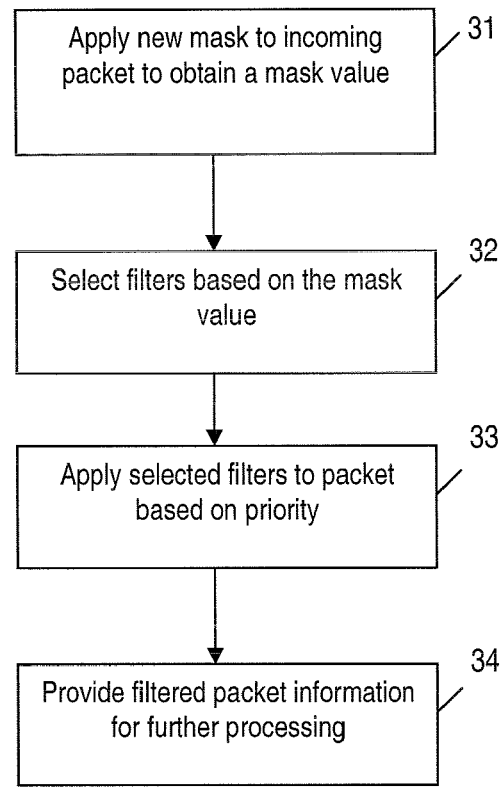
FIG. 2A
FIG. 2B

Original filter parameters and priority

```
Filter 1              Filter 2              Filter 3

Mask: 11110000        Mask: 00111100        Mask: 11001100
Value: 10100000       Value: 00110000       Value: 11001100
```

FIG. 4A

Locating overlapping mask bits with different values

```
Filter 1 & 2          Filter 2 & 3          Filter 1 & 3

Mask1: 11110000       Mask2: 00111100       Mask1: 11110000
Value1: 10100000      Value2: 00110000      Value1: 10100000
 Mask2: 00111100       Mask3: 11001100       Mask3: 11001100
Value2: 00110000      Value3: 11001100      Value3: 11001100
```

FIG. 4B

Resulting mask and filter group association

```
 Mask: 01011000
================================
Value: 00000000       Filter 1
       00001000       Filter 1
       00010000       Filter 2
       00011000       -
       01000000       -
       01001000       Filter 3
       01010000       Filter 2
       01011000       Filter 3
```

FIG. 4C

Run Time Operation: Apply the Mask to incoming packet.
According to the value, apply only the filter(s) in that group.

FIG. 4D

METHOD AND SYSTEM FOR DATA FILTERING FOR DATA PACKETS

FIELD OF THE INVENTION

The present invention relates generally to packet filtering and in particular to data filtering for conditional access messages in the cable industry.

BACKGROUND OF THE INVENTION

Data filtering is performed for datagram streams in cable service provider industry applications such as an OpenCable set-top-box (STB). OpenCable is an initiative managed by CableLabs with the goal of helping the cable industry deploy interactive services. In such applications, a Cable Headend continuously transmits a large amount of network traffic down in the DOCSIS Set-top Gateway (DSG) tunnel (a broadcast IP datagram stream originating at a DOCSIS Set-top Gateway at the Cable Headend and carrying Out-Of-Band messages intended for set-top terminals).

As such, Conditional Access Software is required to filter out the entitlement data packets with data pattern specified by a Conditional Access Client, and forward the data packets to the Client. However, conventional Conditional Access Software is not capable of understanding either the data format of incoming packets, or the format of mask/value patterns therein. As such, conventional Conditional Access Software indiscriminately and inefficiently processes incoming packets. There is a need for such Conditional Access Software to effectively and efficiently examine incoming data packets from a DSG tunnel and find the matching packets.

BRIEF SUMMARY OF THE INVENTION

The present invention provides a method and system for filtering data packets. One embodiment involves filtering data packets using a set of filters, each filter having a bit mask and corresponding bit values, by categorizing the filters into different groups based on their bit mask value differences, and generating a new mask of bits having corresponding bit values, applying the new mask to the incoming packet to select a filter category for the incoming packet, and filtering the incoming packet by applying the group of filters for the selected category to the incoming packet.

Categorizing the filters into different groups based on their bit mask value differences may further include for every pair of filters, detecting overlapping mask bits of differing values. Generating a new mask may further include generating a new mask based on the detected overlapping mask bits of differing values, wherein the new mask represents difference between all pairs of filters in terms of values. Applying the new mask to the incoming packet may further include applying the new mask to an incoming packet to generate a mask value and selecting among the group of filters based on the mask value. Filtering the incoming packet may further include applying the selected group filters to the incoming packet.

These and other features, aspects and advantages of the present invention will become understood with reference to the following description, appended claims and accompanying figures.

BRIEF DESCRIPTION OF THE DRAWINGS

FIG. 2A shows a process for generating a new mask based on overlapping mask bits of different values from pairs of filters, according to an embodiment of the invention.

FIG. 2B shows a process for filtering incoming data packets based on the new mask from the process of FIG. 2A.

FIGS. 4A-D show a numerical example of generating a new mask and applying the new mask to incoming data packets, according to an embodiment of the present invention.

DETAILED DESCRIPTION OF THE INVENTION

The present invention provides a method and system for filtering data packets from a DSG tunnel and finding matching packets. One embodiment involves data filtering for conditional access entitlement messages in data packets from a DOCSIS Set-top Gateway (DSG) tunnel. Multiple filters are categorized into different groups in order to reduce the number of filters applied to data filtering at run time. Specifically, the filter configuration is analyzed, and the filters are categorized into different groups, to generate one (new) mask of bits having corresponding bit values. At run time, a filtering process using the one mask is applied to each incoming data packet, showing which filter category the packet belongs. Then, only filters in that category are applied to the incoming packet. In one example application for a STB that receives packets from a Cable Headend on a DSG tunnel, depending on network traffic patterns and filter parameters, the actual number of filters applied to each incoming packet may be reduced, thus saving STB system resource and expediting packet processing time.

Figure 1:
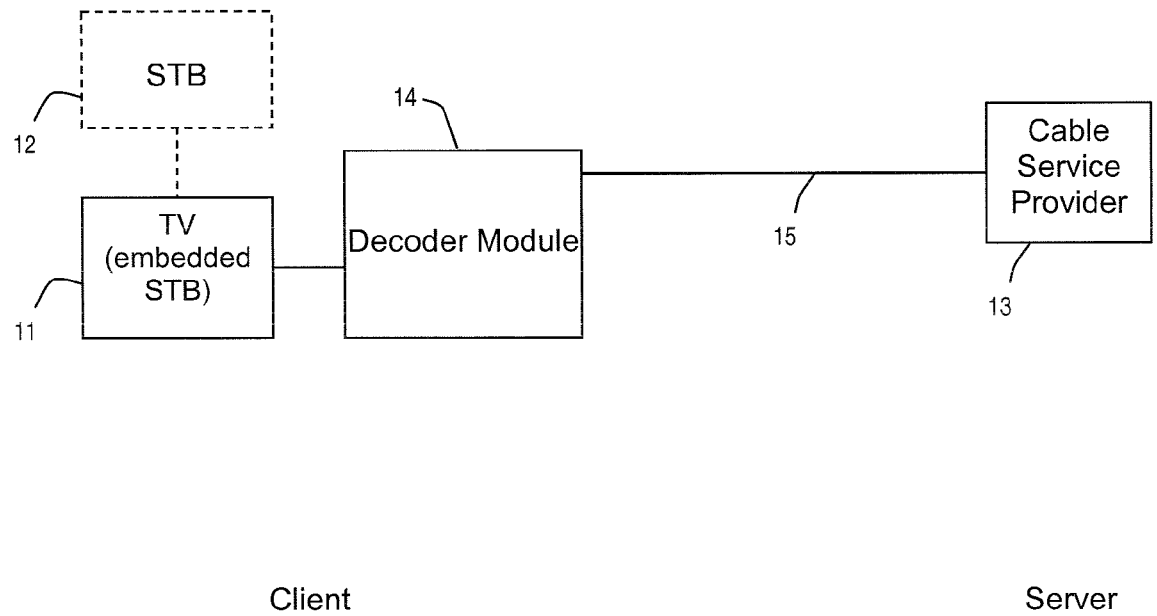
FIG. 1 shows a system implementing an embodiment of data filtering, according to an embodiment of the present invention.

FIG. 1 shows a functional block diagram of a system 10 implementing an embodiment of the invention. The system 10 includes an electronic device such as a TV 11 with an embedded STB, an optional standalone STB 12, and a decoder module 14. The decoder module 14 can be connected to a cable service provider 13 (e.g., Cable Headend) via a communication link 15 for providing audio/visual programming to the decoder module 14. The decoder module performs data filtering of packets received from the provider 13 via a DSG tunnel implemented on the link 15.

The decoder module 14 decodes encoded programming from the cable service provider 13 for display on the TV 11. The decoder module 14 may be an OpenCable Application Platform (OCAP) device (OCAP is a CableLabs-specified middleware for digital televisions and digital cable set-tops). The decoder module may further implement CableCARD negotiations with the headend 13.

An arbitrary filter pattern may be used instead of always filtering on specific fields of a packet. A new mask is generated, wherein the mask bits and values efficiently separate the filters into different groups. The new mask bits can differentiate the filters, without requiring fixed mask bit patterns. The new mask bits and values for a specific filter configuration (i.e., a set of filters) is determined, to optimize the packet processing speed (data filtering). By applying the new mask to each incoming packet, a group of filters suitable for the packet are selected, and other filters are not applied to the packet (thereby expediting packet processing speed).

In an embodiment involving Conditional Access Software for OpenCable STB, Entitlement Message data filtering is performed on major packet fields that require large amounts of processing time and resources. The invention can be directly applied to OpenCable STB, to improve the filtering speed and overall performance. Knowledge of incoming packet formats is not required, and data filtering according to the invention can be applied when filter mask bits are arbitrary and only partially overlap with each other, without use of a conventional sequential filtering process, wherein a packet if filtered by each of a set of filters in sequence, rather than applying filtering selectively according to the invention. When incoming packets hit different filters evenly (i.e., most of the incoming packets do not hit), the invention most effectively reduces the number of filters applied on the incoming packets. A hit means that the incoming packet matches the filtering criteria in one of the filters. As a result the packet will be forwarded to the Client.

Overlapping mask bits with different values from each filter are determined. Each filter includes a mask with a set of bits, and in one example, most of the mask bits for filtering entitlement messages (packets) are in the first 32 bits of each message.

Referring to the process 20 in FIG. 2A, during a filter selection phase, in Block 21, for each pair of filters, the respective mask bits are compared to locate the overlapping mask bits between the pair of filters. Then, in Block 22, for detected overlapping mask bits, the values of those overlapping bits are compared. Next, in Block 23, overlapping bits with different values are detected. As such, for any 2 filters, at a specific bit position, if the mask bit is 1 for both filters, and the value bits are different, it is identified. After examining all pairs of filters, in Block 24, a new mask (resulting mask) is generated based on the detected overlapping bits with different values. The resulting new mask associates each filter to all possible values for the resulting mask.

Referring to process 30 in FIG. 2B, during a filtering phase (i.e., when processing incoming packets from the provider 13), in Block 31, the new mask is applied to each incoming packet to obtain a mask value. In Block 32, based on the mask value, the corresponding filters among the set of filters are selected. In Block 33, the selected filters are applied to that packet, one by one, based on original filter priority, to obtain filtered packet data. In Block 34, the filtered packet data is provided for further processing.

Figure 3:
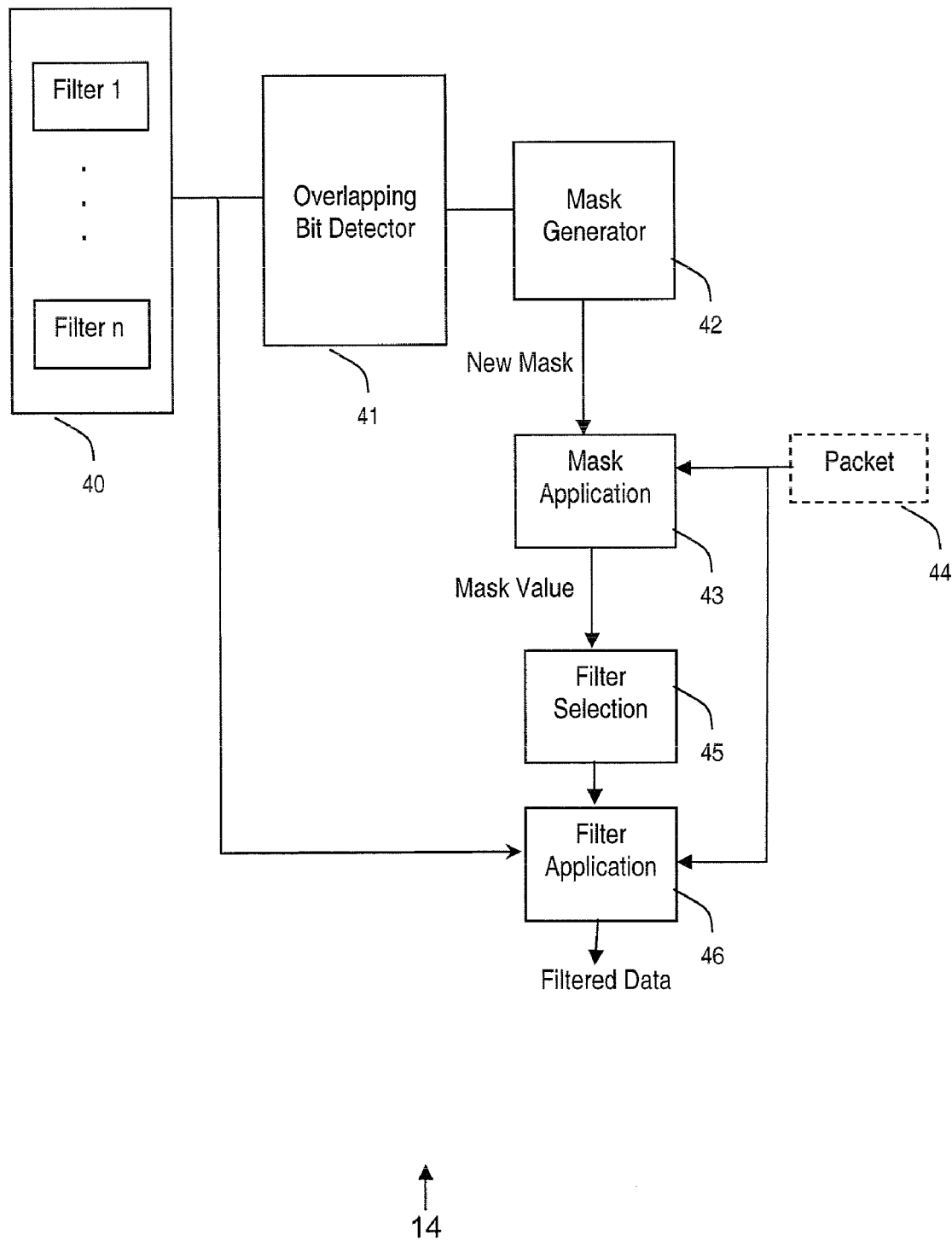
FIG. 3 shows a functional block diagram of a decoder module implementing the processes of FIGS. 2A-B.

FIG. 3 shows a functional block diagram of modules in the decoder 14 (FIG. 1) which implements the processes described in relation to FIGS. 2A-B. Referring now also to FIG. 3, in one implementation the decoder 14 includes a set of filters 40 (e.g., Filter 1, . . . , Filter n). An overlapping bit detector 41, which implements Blocks 21-23 (FIG. 2A), determines overlapping bits of different values. A mask generator 42 implements Block 24 to generate a new mask from said overlapping bits. During the packet filtering phase, a mask application function 43 implements Block 31 (FIG. 2B) by applying the new mask to incoming packet 44 to obtain a mask value. A filter selection function 45 selects among the set of filters 40 based on the mask value. A filter application function 46 implements Block 32 by applying the selected filters to packet, based on priority, to generate filtered packet information.

In another example, the process 20 in FIG. 2A may be implemented separately from the decoder 14, wherein the functions 41 and 42 may be implemented separately from the decoder 14, such that the new mask is provided to the modules 43, 45, 46 for filtering incoming packets.

FIGS. 4A-D shows a numeric example according to the invention. Specifically, FIG. 4A shows a set of three filters (i.e., Filter 1, Filter 2 and Filter 3), each filter includes a mask of 8 bits and corresponding values for the mask bits. The set mask bits (i.e., "1") of each filter are considered as active mask bits, and compared to active mask bits of another filter (bits are numbered 0 to 7 from left to right in the figure). FIG. 4B shows comparing and detecting (locating) overlapping mask bits with different values, for pairs of filters: Filters 1 & 2; Filters 2 & 3; and, Filters 1 & 3. For example, in comparing Filters 1 & 2, active mask bits 4 of the two filters have differing values. In comparing Filters 2 & 3, active mask bits 3 of the two filters have differing values. In comparing Filters 1 & 2, active mask bits 6 of the two filters have differing values. The overlapping mask bits with differing values (i.e., mask bits 3, 4, 6) are used to generate a resulting new mask shown in FIG. 4C. The new mask represents what is different between all pairs of two filters in terms of values. In other words, the new mask represents difference between values of each pair of filters for all filters. Number of bits set ("1") in the new mask, is equal to the number of pairs of filters. Then as shown in FIG. 4D, the new mask is used to select and apply filter groups to the incoming packets, as described. Specifically, the resulting mask (e.g., Mask 01011000 in FIG. 4C) is applied to all incoming packets. Then, according to the resulting value, filter 1 or 2 or 3 is applied.

Applying the resulting mask to an incoming packet involves taking the first 8 bits of the incoming packet (i.e., Data), and performing a logical AND operation with the Mask, where Value=Data AND Mask. Depending on Value, information in FIG. 4C is used to apply Filter 1, 2 or 3 on the incoming packet. If it hits the specific filter, then the incoming packet is forwarded to the Client.

An example run time efficiency analysis is provided below. The analysis is based on said three filters above. Each filter takes two arithmetic operations (2 OPS), one for applying the new mask, and the other for comparing the value (i.e., Value=Data AND Mask). Comparing said value is for finding the matching value in FIG. 4C that equals said value. Further, 10% of the incoming packets hit the three filters evenly (3.33% each) and 90% of the packets miss all three filters and are dropped. After applying the new mask, the value (i.e., Value=Data AND Mask) is evenly distributed to all filter groups.

Operations per 100 incoming packets without the present invention:
  10% of the packets evenly hit 3 filters, 90% of the packet goes through 3 filters and gets dropped, wherein number of operations=(10/3)*(2+4+6)+90*6=40+540=580 operations.

Operations per 100 incoming packets according to an embodiment of the invention:
  The new mask is applied to all packets. Then, for 6 out of 8 values (FIG. 4C), one selected filter is applied, wherein number of operations=100*2+100*(6/8)*2=200+150=350 operations. If too many filters (all 3 filters in this example) are associated with one specific value (e.g., 01001000), then the same process is applied to the next 32 bits to build another value table similar to FIG. 4C.

According to the invention, there is a 39.66% of reduction in the number of filter operations: (580−350)/580=39.66%.

If the number of filters associated to a specific value is above a threshold, the same process can be applied to the next 32 bits, and the filters may be divided into subgroups.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements. Though the present invention has been described with reference to certain versions thereof; however, other versions are possible. Therefore, the spirit and scope of the appended claims should not be limited to the description of the preferred versions contained herein.

What is claimed is:

1. A method of filtering data packets using a set of filters, each filter having a bit mask and corresponding bit values, comprising:
   employing a processor for
      categorizing the filters into different groups based on their bit mask value differences, wherein for every pair of filters, detecting overlapping mask bits of differing values and generating a new mask of bits having corresponding bit values based on the detected overlapping mask bits of differing values, wherein the new mask represents difference between all pairs of filters in terms of values;
      applying the new mask to the incoming packet to select a filter category for the incoming packet; and
      filtering the incoming packet by applying the group of filters for the selected category to the incoming packet.

2. The method of claim 1, wherein:
   applying the new mask to the incoming packet includes applying the new mask to an incoming packet to generate a mask value and selecting among the group of filters based on the mask value; and
   filtering the incoming packet includes applying the selected group filters to the incoming packet.

3. The method of claim 2 further including receiving the incoming data packet is received from a Cable Headend on a DOCSIS Set-top Gateway (DSG) tunnel.

4. The method of claim 3, wherein the packets comprise Entitlement Messages for Conditional Access Software for OpenCable STB (set-top-box).

5. The method of claim 2, wherein detecting overlapping mask bits of differing values includes: for each pair of filters, comparing the respective mask bits to determine overlapping mask bits between the pair of filters, and comparing the values of the overlapping bits to determine overlapping bits with different values.

6. The method of claim 5, wherein generating a new mask further includes generating a new mask after detecting overlapping bits of differing values for all pairs of filters, wherein the new mask associates each filter to all possible values for the new mask.

7. An apparatus for filtering data packets using a set of filters, each filter having a bit mask and corresponding bit values, comprising:
   a hardware processor coupled with:
      an overlapping bit detector configured such that for every pair of filters, the overlapping bit detector detects overlapping mask bits of differing values;
      a mask generator configured for generating a new mask based on the detected overlapping mask bits of differing values, wherein the new mask represents difference between all pairs of filters in terms of values;
      a filter selector configured for applying the new mask to the incoming packet includes applying the new mask to an incoming packet to generate a mask value and selecting among the group of filters based on the mask value; and
      a filtering module configured for filtering the incoming packet includes applying the selected group filters to the incoming packet.

8. The apparatus of claim 7, wherein the incoming data pack is received from a Cable Headend on a DOCSIS Set-top Gateway (DSG) tunnel.

9. The apparatus of claim 8, wherein the packets comprise Entitlement Messages for Conditional Access Software for OpenCable STB (set-top-box).

10. The apparatus of claim 7, wherein overlapping bit detector is configured for detecting the overlapping mask bits of differing values by: for each pair of filters, comparing the respective mask bits to determine overlapping mask bits between the pair of filters, and comparing the values of the overlapping bits to determine overlapping bits with different values.

11. The apparatus of claim 10, wherein the mask generator is further configured for generating a new mask after the overlapping bit detector detects overlapping bits of differing values for all pairs of filters, wherein the new mask associates each filter to all possible values for the new mask.

12. A cable communication system, comprising:
   a headend cable service provider that provides data packets;
   a hardware processor coupled with:
      a decoder module configured for receiving the data packets from the headend cable service provider over a communication link, the decoder module comprising:
         a set of filters, each filter having a bit mask and corresponding bit values;
         an overlapping bit detector configured such that for every pair of filters, the overlapping bit detector detects overlapping mask bits of differing values;
         a mask generator configured for generating a new mask based on the detected overlapping mask bits of differing values, wherein the new mask represents difference between all pairs of filters in terms of values;
         a filter selector configured for applying the new mask to the incoming packet includes applying the new mask to an incoming packet to generate a mask value and selecting among the group of filters based on the mask value; and
         a filtering module configured for filtering the incoming packet includes applying the selected group filters to the incoming packet.

13. The system of claim 12, wherein the incoming data pack is received from a Cable Headend on a DOCSIS Set-top Gateway (DSG) tunnel.

14. The system of claim 13, wherein the packets comprise Entitlement Messages for Conditional Access Software for OpenCable STB (set-top-box).

15. The system of claim 12, wherein the overlapping bit detector is configured for detecting the overlapping mask bits of differing values by: for each pair of filters, comparing the respective mask bits to determine overlapping mask bits between the pair of filters, and comparing the values of the overlapping bits to determine overlapping bits with different values.

16. The system of claim 15, wherein the mask generator is further configured for generating a new mask after the overlapping bit detector detects overlapping bits of differing values for all pairs of filters, wherein the new mask associates each filter to all possible values for the new mask.

17. A method of filtering data packets using a set of filters, each filter having a bit mask and corresponding bit values, comprising:
- employing a processor for
  - categorizing the filters into different groups based on their bit mask value differences, wherein for every pair of filters, detecting overlapping mask bits of differing values and generating a new mask of bits having corresponding bit values based on the detected overlapping mask bits of differing values, wherein the new mask represents difference between all pairs of filters in terms of values;
  - applying the new mask to the incoming packet to select a filter category for the incoming packet to generate a mask value and selecting among the group of filters based on the mask value; and
  - filtering the incoming packet by applying the selected group of filters for the selected category to the incoming packet.

18. A method of filtering data packets comprising:
- employing a processor for
  - detecting overlapping mask bits of differing values for pairs of filters;
  - generating a new mask of bits having corresponding bit values based on the detected overlapping mask bits of differing values, wherein the new mask represents difference between all pairs of filters in terms of values;
  - applying the new mask to an incoming packet to select a filter category for the incoming packet; and
  - filtering the incoming packet by applying a group of filters for the selected category.

* * * * *